(12) United States Patent
Nuthalapati

(10) Patent No.: US 8,022,863 B1
(45) Date of Patent: Sep. 20, 2011

(54) SPATIALLY VARIANT APODIZATION (SVA) FILTER

(75) Inventor: Rao Nuthalapati, Delran, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 43 days.

(21) Appl. No.: 12/613,661

(22) Filed: Nov. 6, 2009

(51) Int. Cl.
*G01S 7/28* (2006.01)

(52) U.S. Cl. ........ 342/189; 342/194; 342/195; 342/196; 342/159; 342/162; 342/134; 342/135; 342/145

(58) Field of Classification Search .......... 342/189, 342/194–196, 159–162, 134–135, 145
See application file for complete search history.

(56) References Cited

U.S. PATENT DOCUMENTS

| | | | | |
|---|---|---|---|---|
| 5,229,775 | A * | 7/1993 | Sakamoto et al. | 342/160 |
| 5,349,359 | A | 9/1994 | Dallaire et al. | |
| 5,594,451 | A * | 1/1997 | Krikorian et al. | 342/160 |
| 6,313,785 | B1 * | 11/2001 | Mattox | 342/106 |
| 7,250,900 | B2 * | 7/2007 | Ohnishi | 342/93 |
| 7,629,920 | B1 * | 12/2009 | Kuhl et al. | 342/160 |
| 7,741,992 | B2 * | 6/2010 | Wang et al. | 342/93 |
| 2006/0227038 | A1 * | 10/2006 | Ohnishi | 342/93 |

OTHER PUBLICATIONS

Chan, Y.T.; Ho, K.C.; Ching, P.C.; , "Scaling and filtering of a sampled signal by the continuous wavelet transform," Time-Frequency and Time-Scale Analysis, 1998. Proceedings of the IEEE-SP International Symposium on , vol., no., pp. 345-348, Oct. 6-9, 1998.*
"Side lobe", from Wikipedia, the free encyclopedia, pp. 1-3, last modified on Apr. 19, 2009.

* cited by examiner

*Primary Examiner* — John B Sotomayor
(74) *Attorney, Agent, or Firm* — Howard IP Law Group, PC

(57) ABSTRACT

A method includes correlating a plurality of samples of a waveform into a correlation domain to provide a mainlobe defined by a first subset of a plurality of pulse-compressed samples and a plurality of sidelobes defined by a second subset of the plurality of pulse-compressed samples. A weight is calculated for at least one of the pulse-compressed samples, and one of a plurality of SVA filter values is selected to apply to the at least one pulse-compressed sample based on the calculated weight of the at least one pulse-compressed sample. The SVA filter values include one, one minus a quotient of one-half divided by the calculated weight of the at least one sample, and a scale factor having a value greater than zero and less than or equal to one. The selected SVA filter values are applied to the at least one pulse-compressed sample.

20 Claims, 5 Drawing Sheets

SPATIALLY VARIANT APODIZATION (SVA) FILTER

FIELD OF DISCLOSURE

The disclosed system and method relate to decreasing sidelobes when performing signal pulse compression. More specifically, the disclosed system and method relate to decreasing sidelobes from correlations of finite data sequences.

BACKGROUND

Pulse compression radar systems utilize waveforms that have narrow autocorrelation functions and time-bandwidth products that are much higher than unity enabling good range resolution (bandwidth dependent) and target detection (energy dependent). In operation, a known electromagnetic pulse is transmitted from a transmitting device, e.g., a transmitter or transceiver, and the transmitted pulse reflects off an object. The reflected signal is received at the receiver or transceiver and undergoes various signal processing techniques including signal pulse compression. For example, the received reflected signal is pulse-compressed by correlating the received reflected signal against a replica of the transmitted signal. The graphical result of a cross-correlation is illustrated in FIG. 1, which shows a composite function including a mainlobe 10 and a plurality of sidelobes 20. In contrast to the composite function illustrated in FIG. 1, an ideal autocorrelation function will have a mainlobe width of zero and zero sidelobes. However, practical finite-duration and finite-bandwidth waveforms have non-zero autocorrelation widths and finite sidelobe levels, which limit the target dynamic range. The limited dynamic range may have a negative effect on the radar system as a weaker target may be located in one of sidelobes and therefore avoid being detected.

Various methodologies have been proposed to reduce the sidelobe levels. For example, one such method includes multiplying the signal after pulse compression by an amplitude function that is maximized at the center and approaches zero at the edges. Such a method is referred to as "apodization". U.S. Pat. No. 5,349,359 issued to Dallaire et al., the entirety of which is incorporated by reference herein, discloses a method of spatially variant apodization (SVA). SVA is a type of non-linear filter that suppresses unwanted sidelobes and preserves the mainlobe.

As taught by Dallaire, the method of applying an SVA filter to a signal includes determining the weights for each sample, n, of the received signal. The weights are calculated according to the following expression:

$$w = \frac{-[I_i^2 + Q_i^2]}{[I_i(I_{i-1} + I_{i+1}) + Q_i(Q_{i-1} + Q_{i+1})]} \quad \text{Eq. 1}$$

Where, $I_i$ represents the real component of the current sample;

$Q_i$ represents the imaginary component of the current sample;

$I_{i-1}$ represents the real component of the previous sample;

$Q_{i-1}$ represents the imaginary component of the previous sample;

$I_{i+1}$ represents the real component of the following sample; and $Q_{i+1}$ represents the imaginary component of the following sample.

The output of the SVA filter, y(n), is based on the input of the SVA filter, x(n), and the weight, w, of the current sample as calculated in accordance with Equation 1 as follows:

$$y(n) = x(n); \quad w < 0$$
$$y(n) = x(n)\left[1 - \frac{0.5}{w}\right]; \quad w > 0.5$$
$$y(n) = 0; \quad 0 \le w \le 0.5$$

The SVA filter can be difficult to implement in hardware because of discontinuities in filter outputs when the calculated weight of the sample is greater than or equal to zero and less than or equal to one-half. In addition, the SVA filter may not be implemented for all waveforms types including, for example, non-linear frequency modulated (NLFM) waveforms. NLFM waveforms have lower peak sidelobe levels (PSLs) and do not incur losses due to weighting compared to linear frequency modulated (LFM) waveforms. Additionally, NLFM waveforms have a constant-amplitude envelope, which enables efficient generation of high power signals, with a continuous phase so that they are spectrally well contained. Accordingly, these features have led to the implementation of NLFM waveforms in pulse compression radar systems for tracking targets.

Accordingly, an improved SVA filter design that is suitable for use with NLFM waveforms is desirable.

SUMMARY

A method is disclosed for filtering waveforms with a spatially variant apodization (SVA) filter. The method includes correlating a plurality of samples of a waveform into a correlation domain to provide a plurality of pulse-compressed samples, and calculating a weight for at least one of the plurality of pulse-compressed samples. The correlation provides a mainlobe defined by a first subset of the pulse-compressed samples and a plurality of sidelobes defined by a second subset of the pulse-compressed samples. One of a plurality of SVA filter values is selected to be applied to the at least one of the pulse-compressed samples based on the calculated weight of the at least one pulse-compressed sample. The SVA filter values include one, if the calculated weight of the at least one pulse-compressed sample is less than zero; one minus a quotient of one-half divided by the calculated weight of the at least one pulse-compressed sample, if the calculated weight of the at least one pulse-compressed sample is greater than one-half; and a scale factor having a value greater than zero and less than or equal to one, if the calculated weight of the at least one pulse-compressed sample is greater than or equal to zero or less than or equal to one-half. The selected SVA filter value is applied to the at least one pulse-compressed sample.

Further disclosed is a spatially variant apodization (SVA) filter system. The system includes a computer readable storage medium configured to store a lookup table and a processor in signal communication with the computer readable storage medium. The processor is configured to correlate a plurality of samples of a waveform into a correlation domain to provide a plurality of pulse-compressed samples, calculate weights for at least one of the plurality of pulse-compressed samples, and select one of a plurality of spatially variant apodization (SVA) filter values to apply to the at least one pulse-compressed sample based on the calculated weight of the at least one pulse-compressed sample. The transformed waveform has a mainlobe defined by a first subset of the pulse-compressed samples and a plurality of sidelobes defined by a second subset of the pulse-compressed samples. The SVA filter values include one, if the calculated weight of the at least one pulse-compressed sample is less than zero; one minus a quotient of one-half divided by the calculated weight of the at least one pulse-compressed sample, if the calculated weight of the at least one pulse-compressed sample is greater than one-half; and a scale factor having a value greater than zero and less than or equal to one, if the calculated weight of the at least one pulse-compressed sample is greater than or equal to zero and less than or equal to one-half. The processor is configured to apply the selected SVA filter value to the at least one pulse-compressed sample.

Also disclosed is a method for applying a spatially variant apodization (SVA) filter to a non-linear frequency modulated (NLFM) waveform received at a receiver. The method includes sampling the NLFM waveform with an analog-to-digital converter (ADC) to provide a plurality of samples of the NLFM waveform, correlating the plurality of samples into a correlation domain to provide a plurality of pulse-compressed samples, and calculating weights for each of the plurality of pulse-compressed samples. The correlation providing a mainlobe defined by a first subset of the plurality of pulse-compressed samples and a plurality of sidelobes defined by a second subset of the plurality of pulse-compressed samples. For each of the plurality of pulse-compressed samples, one of the SVA filter values is selected to be applied to a respective pulse-compressed sample based on the calculated weight of the respective pulse-compressed sample. The SVA filter values include one, if the calculated weight of the pulse-compressed sample is less than zero, one minus a quotient of one-half divided by the calculated weight of the pulse-compressed sample, if the calculated weight is greater than one-half, and a scale factor having a value greater than zero and less than or equal to one, if the calculated weight of the pulse-compressed sample is greater than or equal to zero and less than or equal to one-half. The selected SVA filter values are applied to a fourth plurality of pulse-compressed samples.

DETAILED DESCRIPTION

Figure 1:
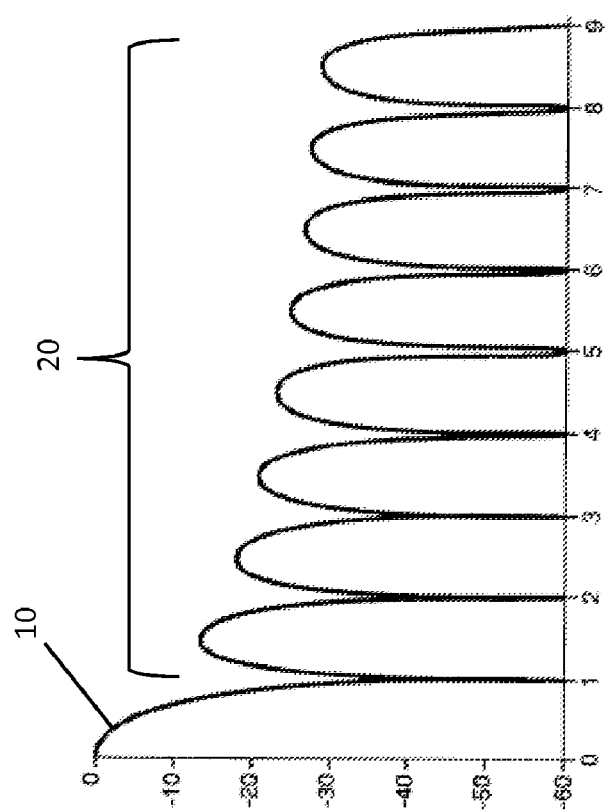
FIG. 1 illustrates one example of a composite function including a mainlobe and a plurality of side lobes.
Figure 2B:
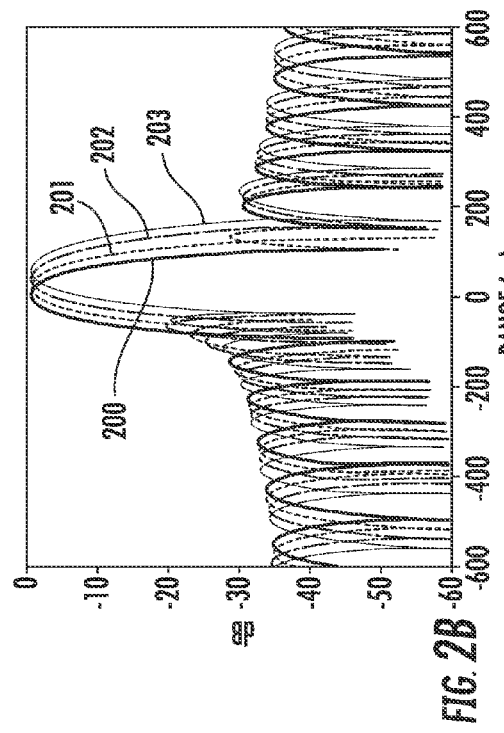
FIGS. 2A-2D illustrate the Doppler tolerance of a non-linear frequency modulated waveform for a variety of target velocities and time bandwidth products.
Figure 2D:
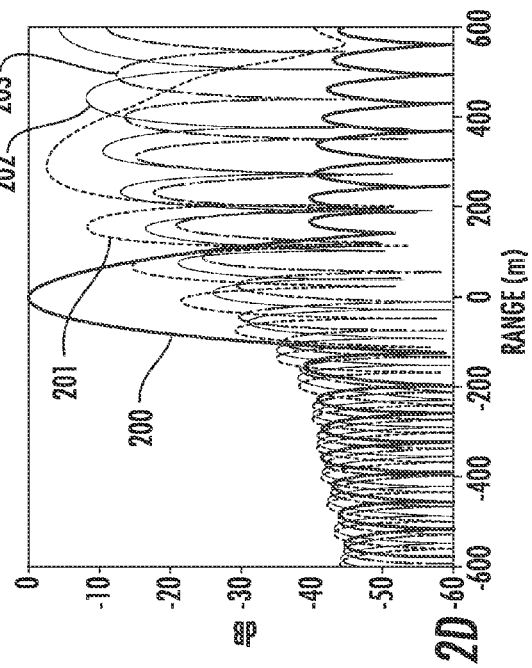
Figure 2A:
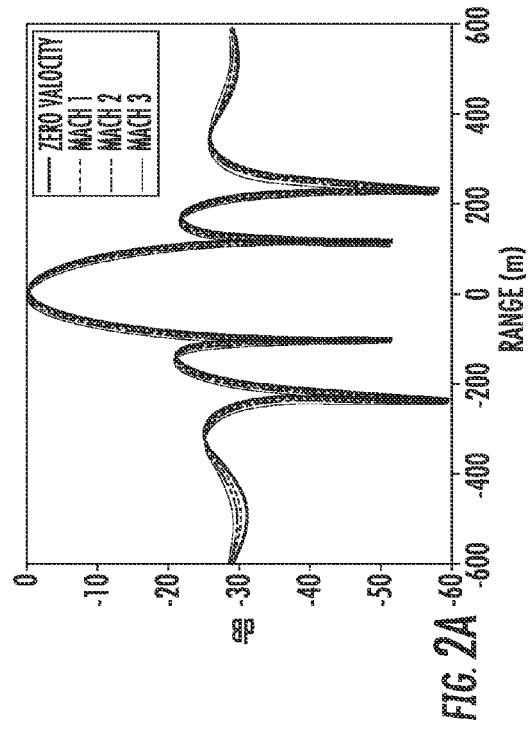
Figure 2C:
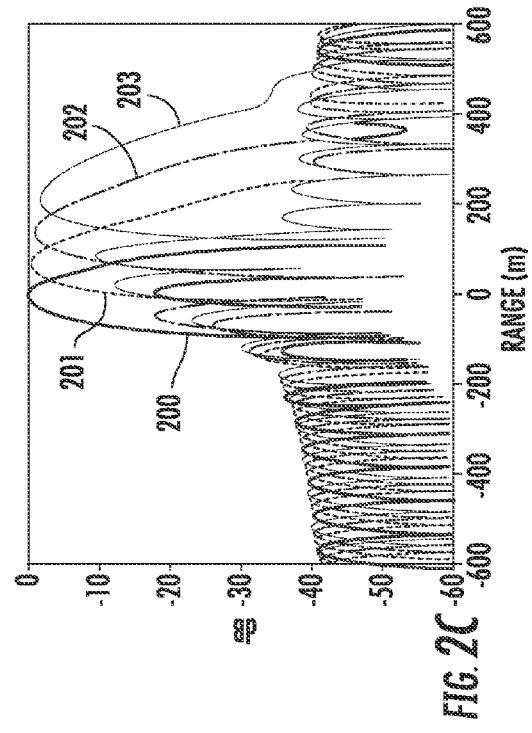

As described above, some of the characteristics of non-linear frequency modulated (NLFM) waveforms have led radar designers to utilize NLFM waveforms in target tracking radar systems. However, NLFM waveforms have a Doppler tolerance between the extreme limits of phase-modulated waveforms and LFM waveforms. The Doppler intolerance of NLFM waveforms is illustrated in FIGS. 2A-2D, which are graphs of the NLFM signal strength versus range for stationary (lines 200) and move targets, e.g., targets moving at Mach 1 (lines 201), Mach 2 (lines 202), and Mach 3 (lines 203), in radar systems having various time-bandwidth products (TB). Specifically, FIG. 2A illustrates the NLFM waveforms for a system having TB equal to 16; the waveforms illustrated in FIG. 2B are for a system having a TB equal to 64; the waveforms illustrated in 2C is for a system having a TB of 256; and the waveforms illustrated in FIG. 2D are for a system having a TB of 1024. FIGS. 2A-2D show that as the TB is increased from 16 to 1024, the NLFM waveforms experience an increasingly larger Doppler shift causing the distortion to the right of the mainlobe for targets moving at Mach 1 (i.e., the speed of sound), Mach 2 (i.e., twice the speed of sound), and Mach 3 (i.e., three times the speed of sound).

The Doppler intolerance of NLFM waveforms illustrated in FIGS. 2A-2D contributes to the inability of the SVA filter disclosed by Dallaire to be used in connection with NLFM waveforms. However, disclosed herein is an improved SVA filtering method that may be implemented for a wide variety of signal waveforms including NLFM waveforms. The improved SVA filter, F, is described follows:

$$y(n) = x(n); \qquad w < 0$$
$$y(n) = x(n)\left[1 - \frac{0.5}{w}\right]; \quad w > 0.5$$
$$y(n) = x(n) * s; \qquad 0 \le w \le 0.5, 0 < s \le 1.0$$

Where,
x(n) is the input of the improved SVA filter;
y(n) is the output of the improved SVA;
w is the weight of a sample, n, as calculated in Equation 1; and
s is a scale factor.

The scale factor, s, may be set between zero and one depending on the specific application and desired response of the SVA filter to control the PSLs. In some embodiments, the scale factor, s, may be a function of pulse width, Doppler frequency shift, and nominal sidelobe level, where the nominal sidelobe level may be an average sidelobe level near the mainlobe excluding the dominant sidelobe of the NLFM signal. The distortion of the uncompensated NLFM waveform pulse compression output is primarily determined by the product of the pulse width and the Doppler frequency shift. The distortion also increases as the NLFM waveform bandwidth increases. Accordingly, the level of the dominant sidelobe due to distortion is a function of several parameters, and thus the selection of the scale factor, s, is application dependent. Nevertheless, the value of the scale factor, s, is in the range of zero to one.

In one example, a scale factor, s, may be selected such that the dominant sidelobe is suppressed to the level of the nominal sidelobe. The process of selecting the scale factor, s, may be done iteratively as will be understood by one skilled in the art using a software simulation package such as MATLAB, GNU Octave, or Scilab to name a few. The level of the dominant sidelobe and the optimal value of the scale factor, s, may be estimated by iteratively simulating different target velocities and time-bandwidth products of waveforms.

Applying the scale factor, s, to the input of the improved SVA filter for weights, w, having a value that is greater than or equal to zero and less than or equal to one-half, provides the SVA filter with a continuous output, as the discontinuity of the conventional SVA filter for weights values greater than or equal to zero and less than or equal to one-half is eliminated. For example, if the calculated weight of the sample is greater than or equal to zero and less than or equal to one-half when a pulse compression output of a signal is scaled to zero using a conventional SVA filter, then the logarithmic conversion of the pulse compression output used to convert a ratio of the mainlobe amplitude to the sidelobe amplitude in decibels causes numerical ill-conditioning in hardware. The improved SVA filter avoids this hardware implementation problem by setting the scale factor, s, to a value greater than zero. Eliminating the discontinuity for weights greater than or equal to zero and less than or equal to one-half enables the improved SVA filter to be more easily be implemented in hardware compared to the conventional SVA filters described above.

The improved SVA filter described above may be modified such that it is suitable for use with NLFM waveforms. For example, the pulsed compressed output, x(m), of a received NLFM waveform having pulsed compressed samples, m, can be written as:

$$x(m) = \sum_{n=0}^{N-1} r(n+m)p(n); -(N-1) \leq m \leq (N-1) \quad \text{Eq. 2}$$

Where, r(n) is the received NLFM waveform having a length of $\{0 \leq n \leq N-1\}$;

p(n) is the reference waveform having a length of $\{0 \leq n \leq N-1\}$

N is the number of samples in the received signal.

The improved SVA filter, F, may be applied to the pulse compressed output, x(m), of a NLFM waveform as follows:

$$y(n) = F[x(n)]; -M \leq n \leq M$$

$$y(n) = x(n); -(N-1) \leq n \leq (-M); M < n \leq (N-1)$$

Where,

M is the number of samples from the mainlobe to which the modified SVA filtering is applied.

In some embodiments, the value of M is selected as the largest offset from the peak of the mainlobe to the first null on either side of the mainlobe of the pulse compression output.

Processing NLFM waveforms as described above enables the reduction of sidelobes on one side of the mainlobe, which in turn compensates for the Doppler intolerance of NLFM waveforms. Additionally, varying the scale factor, s, enables a desired response of the improved SVA filter to be achieved. As will be understood by one skilled in the art, the value of the scale factor, s, may be varied depending on the requirements of the output of the filter. For example, as the scale factor, s, approaches zero, the output of the SVA filter is reduced as are the PSLs to one side of the mainlobe, and as the scale factor, s, approaches one, the output of the improved SVA filter resembles the input of the improved SVA filter and thus the PSLs of the output more closely match the PSLs of the input.

Figure 3A:
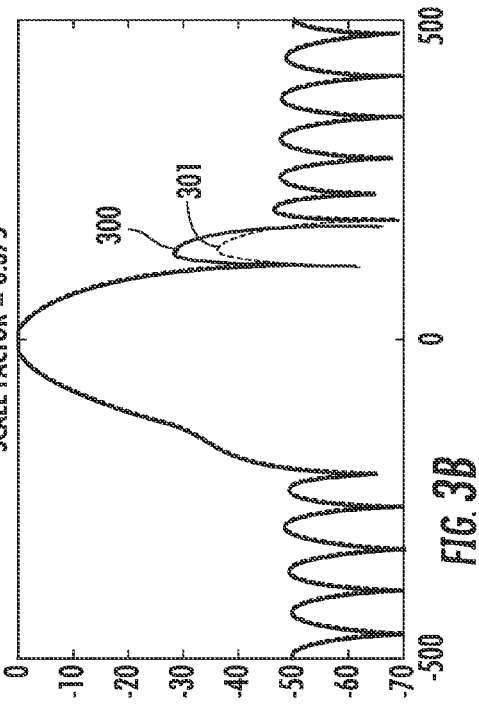
FIGS. 3A-3D illustrate the results of one example of an improved SVA filter being applied to a non-linear frequency modulated waveform for various scale factors.
Figure 3B:
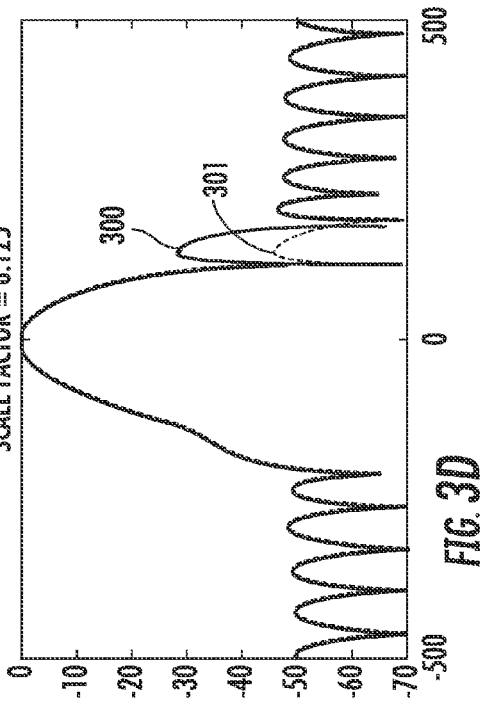
Figure 3C:
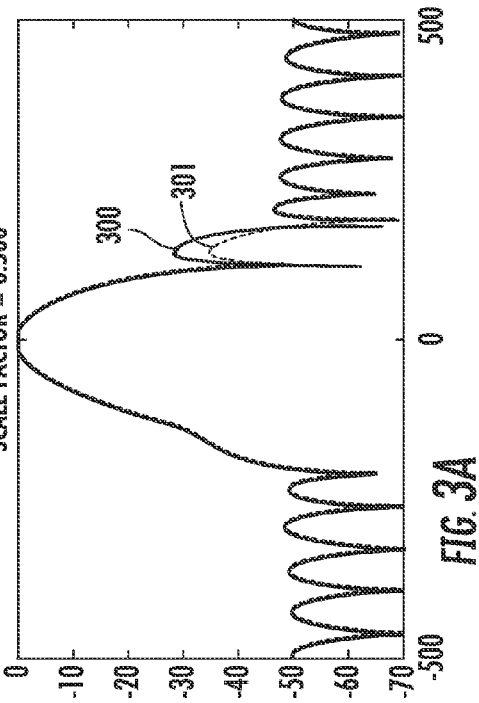
Figure 3D:
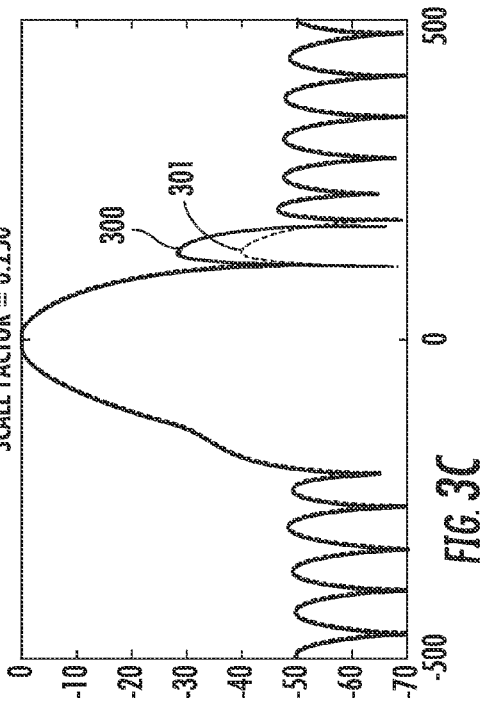

FIGS. 3A-3D illustrate examples of a NLFM waveform that has been processed by the improved SVA filter (lines 301) described above for various scale factors compared to an unprocessed NLFM waveform (lines 300). The NLFM waveforms in FIGS. 3A-3D were designed for a time-bandwidth product of 2000, a Taylor weighted window with −40 dB sidelobe level, and n̄=8 was used to design the NLFM waveform. The waveforms in FIGS. 3A-3D were Doppler shifted $\{f_dT\}$ with a value of 0.25. The result is correlated with its original version to get an equivalent pulse compression output. In FIG. 3A, the first sidelobe to the right of the mainlobe is reduced approximately 5 dB when the improved SVA filter with a scale factor, s, of 0.5 is applied. In FIG. 3B, the first sidelobe to the right of the mainlobe is reduced approximately 7 dB when the improved SVA filter with a scale factor, s, of 0.375 is applied. FIG. 3C illustrates that the first sidelobe to the right of the mainlobe is reduced approximately 10 dB when the improved SVA filter with a scale factor, s, of 0.25 is applied. FIG. 3D illustrates that the first sidelobe to the right of the mainlobe is reduced by approximately 15 dB when the improved SVA filter with a scale factor, s, of 0.125 is applied. Accordingly, FIGS. 3A-3D illustrate that the PSL for the first sidelobe adjacent to the mainlobe decreases as the scale factor, s, decreases. Additionally, the dominant sidelobe due to the uncompressed Doppler of NLFM waveform is controlled without affecting the mainlobe or the other sidelobes.

Figure 4:
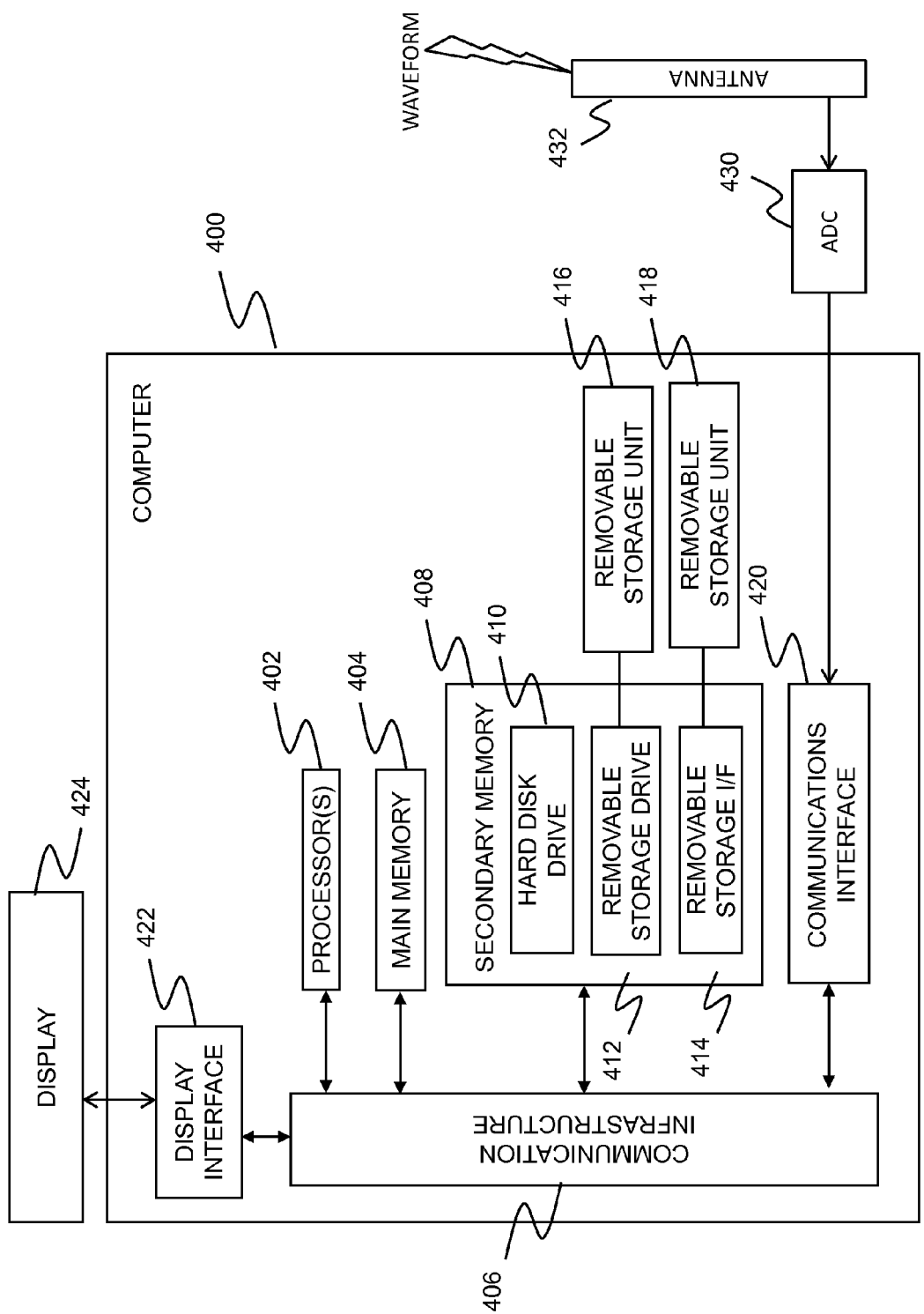
FIG. 4 illustrates one example of a system configured to implement an improved SVA system.

The improved SVA filter described above may be implemented in a variety of systems. FIG. 4 illustrates one example of a computer system that may be configured to implement the improved SVA filter described above. As shown in FIG. 4, the computer system 400 may include one or more processors, such as processor(s) 402. Processor(s) 402 may be any central processing unit (CPU), microprocessor, micro-controller, or computational device or circuit for executing instructions and be connected to a communication infrastructure 406 (e.g., a communications bus, cross-over bar, or network). Various software embodiments are described in terms of this exemplary computer system. After reading this description, it will be apparent to one skilled in the art how to implement the method using other computer systems or architectures.

Computer system 400 may include a display interface 422 that forwards graphics, text, and other data from the communication infrastructure 406 (or from a frame buffer not shown) for display on a monitor or display unit 424.

Computer system also includes a main memory 404, such as a random access (RAM) memory, and may also include a secondary memory 408. The secondary memory 408 may include a more persistent memory such as, for example, a hard disk drive 410 and/or removable storage drive 412, representing a floppy disk drive, a magnetic tape drive, an optical disk drive, or the like. The removable storage drive 412 reads from and/or writes to a removable storage unit 416 in a manner that is understood by one skilled in the art. Removable storage unit 412 represents a floppy disk, magnetic tape, optical disk, or the like, which may be read by and written to by removable storage drive 412. As will be understood by one skilled in the art, the removable storage unit 416 may include a computer usable storage medium having stored therein computer software and/or data.

In some embodiments, secondary memory 408 may include other devices for allowing computer programs or other instructions to be loaded into computer system 400. Such devices may include, for example, a removable storage unit 418 and a corresponding interface 418. Examples of such units 418 and interfaces 414 may include a program cartridge and cartridge interface (such as that found in video game devices), a removable memory chip (such as an erasable programmable read only memory (EPROM)), or programmable read only memory (PROM)) and associated socket, and other removable storage units 418 and interfaces 414, which allow software and data to be transferred from the removable storage unit 418 to computer system 400.

Computer system 400 may also include a communications interface 420, which allows software and data to be transferred between computer system 400 and external devices such as, for example, an antenna 432 and ADC 430. Examples of communications interface 420 may include, without limitation, a modem, a network interface (such as an Ethernet card), a communications port, a Personal Computer Memory Card International Association (PCMCIA) slot and card, or any combination thereof. Software and data transferred via communications interface 420 are in the form of signals, which may be electronic, electromagnetic, optical, or other signals capable of being received by communications interface 420. These signals are provided to communications interface 420 via a communications path or channel. The channel may be implemented using wire or cable, fiber optics, a telephone line, a cellular link, a radio frequency (RF) link, or other communication channels.

In this document, the terms "computer program medium" and "computer readable medium" refer to media such as removable storage units 416, 418, or a hard disk installed in hard disk drive 410. These computer program products provide software to computer system 400. Computer programs (also referred to as computer control logic) may be stored in main memory 404 and/or secondary memory 408. Computer programs may also be received via communications interface 420. Such computer programs, when executed by a processor(s) 402, enable the computer system 400 to perform the features of the method discussed herein.

In an embodiment where the method is implemented using software, the software may be stored in a computer program product and loaded into computer system 400 using removable storage drive 412, hard drive 410, or communications interface 406. The software, when executed by a processor(s) 402, causes the processor(s) 402 to perform the functions of the method described herein.

In another embodiment, the method is implemented primarily in hardware using, for example, hardware components such as application specific integrated circuits (ASICs). Implementation of the hardware state machine so as to perform the functions described herein will be understood by persons skilled in the art. In yet another embodiment, the method is implemented using a combination of both hardware and software.

Figure 5:
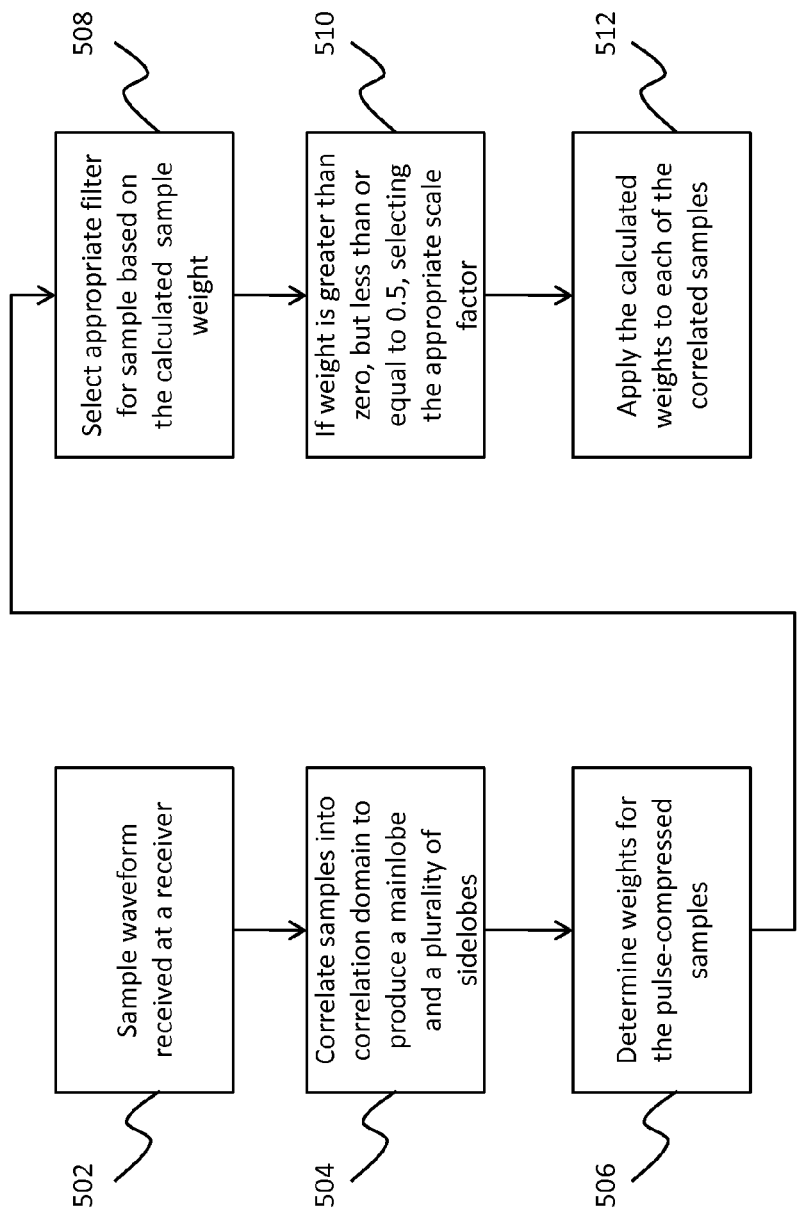
FIG. 5 illustrates one example of a method that may be formed by the system illustrated in FIG. 4.

FIG. 5 illustrates one example of a method for applying an improved SVA filter to a waveform. The method may be implemented using the system illustrated in FIG. 4 and will be described accordingly. However, one skilled in the art will understand that the method may be implemented using other computer systems. Referring collectively now to FIGS. 4 and 5, a waveform is received at the antenna 432 at block 502. At block 504, the waveform is sampled to produce a plurality of samples. In some embodiments, the waveform may be sampled by the ADC 430 of the computer system 400 as illustrated in FIG. 4 to provide the plurality of samples as understood by one skilled in the art.

At block 504, the plurality of samples are pulse compressed or cross-correlated with a replica of the transmitted signal. The cross-correlation may be performed by Fourier transforming the samples using a Fast Fourier Transform (FFT) into the frequency domain as will be understood by one skilled in the art. The signal output from the FFT is multiplied with a conjugated version of the reference signal FFT output, and an inverse Fourier transform is performed using an inverse FFT (IFFT) of the product of the output FFT of the received signal and the conjugated version of the reference signal FFT to transform the product into the correlation (time) domain.

A weight, w, may be determined for some or all of the plurality of pulse-compressed samples in accordance with Equation 1 as described above at block 508. The weights, w, of the pulse-compressed samples are used to determine an appropriate SVA filter value at block 510. For example, if the calculated weight of a sample is less than zero, i.e., a negative number, then the SVA filter value for the sample may be set at one; if the calculated weight of a sample is greater than 0.5, then the SVA filter value for the sample may be set equal to the value of;

$$1 - \frac{0.5}{w};$$

and if the calculated weight of a sample is greater or equal to zero and less than or equal 0.5, then the SVA filter value may be set equal to a scaling factor, s. The scaling factor, s, may be stored in a lookup table in a computer readable storage medium such as primary or secondary memory 408, 410. As described above, the value of the scaling factor, s, may be selected by the SVA filter designer based on a variety of factors. For example, the scaling factor may be selected to minimize a mean square error (MSE) or to minimize the PSL of the sidelobe adjacent to the mainlobe.

The MSE may be estimated by taking the difference of the first or dominant sidelobe of the compensated NLFM pulse compression output and the uncompensated or unfiltered NLFM pulse compression output. The difference is squared and averaged to calculate the MSE. In selecting a scale factor, s, based on the MSE, an iterative algorithm to find an optimal scale factor may be implemented in simulation tools such as MATLAB or the like. The scale factor, s, can be initialized to a value greater than zero but less than one, e.g., one-half. The MSE is calculated for the initial scale factor and then stored. The scale factor may be incremented or decremented by a step value, e.g., 0.1, and the MSE for the incremented or decremented scale factor is again calculated and compared to the stored MSE value. If the scale factor was incremented and the MSE of the incremented scale factor is greater than the MSE for the initial scale factor, then the scale factor is decremented and the MSE recalculated and compared to the initial scale factor. If the scale factor was incremented and the MSE of the incremented scale factor is lower than the MSE for the initial scale factor, then the scale factor is further incremented, and the MSE is recalculated and compared to the MSE of the previous scale factor. These steps may be repeated until convergence is reached.

At block 512, the SVA filter value for a sample determined at block 510 is applied to the respective sample. As will be understood by one skilled in the art, the SVA filter values may be applied to each of the pulse-compressed samples. For NLFM waveforms, the filter values would be applied to the samples that correspond to sidelobes on one side of the mainlobe as described above.

The disclosed method may be at least partially embodied in the form of computer-implemented processes and apparatus for practicing the method. The method may also be at least partially embodied in the form of computer program code embodied in tangible machine readable storage media, such as RAM, read only memories (ROMs), CD-ROMs, DVD-ROMs, BD-ROMs, hard disk drives, flash memories, or any other machine-readable storage medium, wherein, when the computer program code is loaded into and executed by a computer, the computer becomes an apparatus for practicing the method. The method may be embodied at least partially in the form of computer program code, whether loaded into and/or executed by a computer, such that, when the computer program code is loaded into and executed by a computer, the computer becomes an apparatus for practicing the method. When implemented on a general-purpose processor, the computer program code segments configure the processor to create specific logic circuits. The method may alternatively be at least partially embodied in a digital signal processor formed of application specific integrated circuits for performing the method according to the principles disclosed herein.

Although the system and method have been described in terms of exemplary embodiments, it is not limited thereto. Rather, the appended claims should be construed broadly, to include other variants and embodiments of the system and method, which may be made by those skilled in the art without departing from the scope and range of equivalents of the system and method.

What is claimed is:

1. A method for filtering waveforms with a spatially variant apodization (SVA) filter, comprising:
    correlating in a computer process, a plurality of samples of a sampled waveform into a correlation domain to provide a plurality of pulse-compressed samples, a first subset of the plurality of pulse-compressed samples defining a mainlobe and a second subset of the pulse-compressed samples defining a plurality of sidelobes;
    calculating a weight for at least one of the plurality of pulse-compressed samples in a computer process; and
    selecting in a computer process, one of a plurality of SVA filter values to apply to the at least one of the plurality of pulse-compressed samples based on the calculated weight of the at least one pulse-compressed sample, the SVA filter values comprising:
        one, if the calculated weight for the at least one pulse-compressed sample is less than zero,
        one minus a quotient of one-half divided by the calculated weight of the at least one pulse-compressed sample, if the calculated weight of the at least one pulse-compressed sample is greater than one-half, or
        a scale factor having a value greater than zero and less than or equal to one, if the calculated weight of the at least one pulse-compressed sample is greater than or equal to zero and less than or equal to one-half; and
    applying the selected SVA filter value to the at least one pulse-compressed sample in a computer process.

2. The method of claim 1, wherein the waveform is a non-linear frequency modulated (NLFM) waveform.

3. The method of claim 2, wherein SVA filter values are selected for each of the plurality of pulse-compressed samples, and wherein a respective SVA filter value is applied to each of a third subset of pulse-compressed samples, the third subset having a smaller number of samples than the second subset.

4. The method of claim 3, wherein each of the third subset of the plurality of pulse-compressed samples are disposed on one side of the mainlobe defined by the first subset of pulse-compressed samples.

5. The method of claim 1, wherein the weights, w, are calculated according to:

$$w = \frac{-[I_i^2 + Q_i^2]}{[I_i(I_{i-1} + I_{i+1}) + Q_i(Q_{i-1} + Q_{i+1})]}$$

where,
   $I_i$ represents a real component of a current pulse-compressed sample,
   $Q_i$ represents an imaginary component of the current pulse-compressed sample,
   $I_{i-1}$ represents a real component of a previous pulse-compressed sample,
   $Q_{i-1}$ represents an imaginary component of the previous pulse-compressed sample,
   $I_{i+1}$ represents a real component of a following pulse-compressed sample, and
   $Q_{i+1}$ represents an imaginary component of the following pulse-compressed sample.

6. The method of claim 1, wherein the scale factor is retrieved from a lookup table.

7. The method of claim 1, wherein the scale factor is selected to minimize a mean square error.

8. A system for spatially variant apodization filtering, the system comprising:
    a computer readable storage medium configured to store a lookup table; and
    a processor in signal communication with the computer readable storage medium, the processor configured to:
        correlate a plurality of samples of a waveform into a correlation domain to provide a plurality of pulse-compressed samples, a first subset of the plurality of pulse-compressed samples defining a mainlobe and a second subset of the pulse-compressed samples defining a plurality of sidelobes,
        calculate a weight for at least one of the plurality of pulse-compressed samples, and
        select one of a plurality of spatially variant apodization (SVA) filter values to apply to the at least one pulse-compressed sample based on the calculated weight for the at least one sample, the SVA filter values comprising:
            one, if the calculated weight of the at least one pulse-compressed sample is less than zero,
            one minus a quotient of one-half divided by the calculated weight of the at least one pulse-compressed sample, if the calculated weight for the at least one pulse-compressed sample is greater than one-half, or
            a scale factor having a value greater than zero and less than or equal to one, if the calculated weight of the at least one pulse-compressed sample is greater than or equal to zero and less than or equal to one-half, and
        apply the selected SVA filter value to the at least one pulse-compressed sample.

9. The system of claim 8, wherein the waveform is a non-linear frequency modulated (NLFM) waveform.

10. The system of claim 9, wherein SVA filter values are selected for each of the plurality of pulse-compressed samples, and wherein a respective SVA filter value is applied to each of a third subset of the samples, the third subset having a smaller number of samples than the second subset.

11. The system of claim 10, wherein each of the third plurality of pulse-compressed samples are disposed on one side of the mainlobe defined by the first subset of the plurality of pulse-compressed samples.

12. The system of claim 8, wherein the weights, w, are calculated according to:

$$w = \frac{-[I_i^2 + Q_i^2]}{[I_i(I_{i-1} + I_{i+1}) + Q_i(Q_{i-1} + Q_{i+1})]}$$

where,
   $I_i$ represents a real component of a current pulse-compressed sample,
   $Q_i$ represents an imaginary component of the current pulse-compressed sample,
   $I_{i-1}$ represents a real component of a previous pulse-compressed sample, $Q_{i-1}$ represents an imaginary component of the previous pulse-compressed sample, $I_{i+1}$ represents a real component of a following pulse-compressed sample, and $Q_{i+1}$ represents an imaginary component of the following pulse-compressed sample.

13. The system of claim 8, wherein the scale factor is stored in the lookup table.

14. The system of claim 8, wherein the scale factor is selected to minimize a mean square error.

15. A method for applying a spatially variant apodization (SVA) filter to a non-linear frequency modulated (NLFM) waveform received at a receiver, the method comprising:

sampling the NLFM waveform with an analog-to-digital converter (ADC) to provide a plurality of samples of the NLFM waveform;

correlating in a computer process, the plurality of samples into a correlation domain to provide a plurality of pulse-compressed samples, a first subset of the pulse-compressed samples defining a mainlobe and a second subset of the plurality of pulse-compressed samples defining a plurality of sidelobes;

calculating a weight for each of the first plurality of pulse-compressed samples in a computer process; and for each of the plurality of pulse-compressed samples, selecting in a computer process, one of a plurality of SVA filter values to apply to a respective pulse-compressed sample based on the calculated weight for the respective pulse-compressed sample, the SVA filter values comprising:

one, if the calculated weight for the pulse-compressed sample is less than zero, one minus a quotient of one-half divided by the calculated weight for the pulse-compressed sample, if the calculated weight is greater than one-half, and a scale factor having a value greater than zero and less than or equal to one, if the calculated weight of the pulse-compressed sample is greater than or equal to zero and less than or equal to one-half; and applying the respective SVA filter value to each of a third plurality of pulse-compressed samples in a computer process.

16. The method of claim 15, wherein the third subset of pulse-compressed samples has a smaller number of samples than the second subset of pulse-compressed samples.

17. The method of claim 15, wherein each of the third subset of pulse-compressed samples are disposed on one side of the mainlobe defined by the first subset of pulse-compressed samples.

18. The method of claim 15, wherein the weights, w, are calculated according to:

$$w = \frac{-[I_i^2 + Q_i^2]}{[I_i(I_{i-1} + I_{i+1}) + Q_i(Q_{i-1} + Q_{i+1})]}$$

where, $I_i$ represents a real component of a current pulse-compressed sample, $Q_i$ represents an imaginary component of the current pulse-compressed sample, $I_{i-1}$ represents a real component of a previous pulse-compressed sample, $Q_{i-1}$ represents an imaginary component of the previous pulse-compressed sample, $I_{i+1}$ represents a real component of a following pulse-compressed sample, and $Q_{i+1}$ represents an imaginary component of the following pulse-compressed sample.

19. The method of claim 15, wherein the scale factor is retrieved from a lookup table.

20. The method of claim 15, wherein the scale factor is selected to minimize a mean square error.

\* \* \* \* \*